Figure 1:
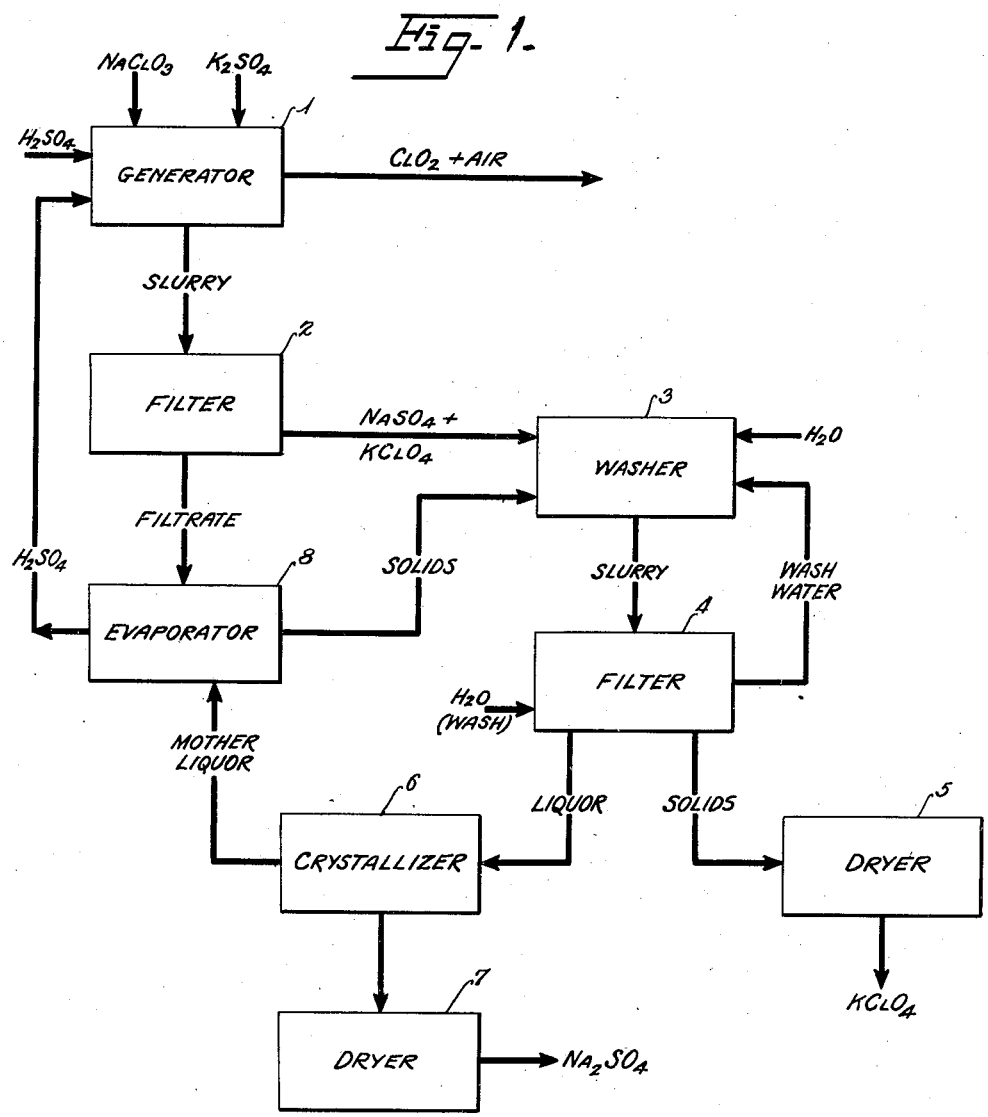

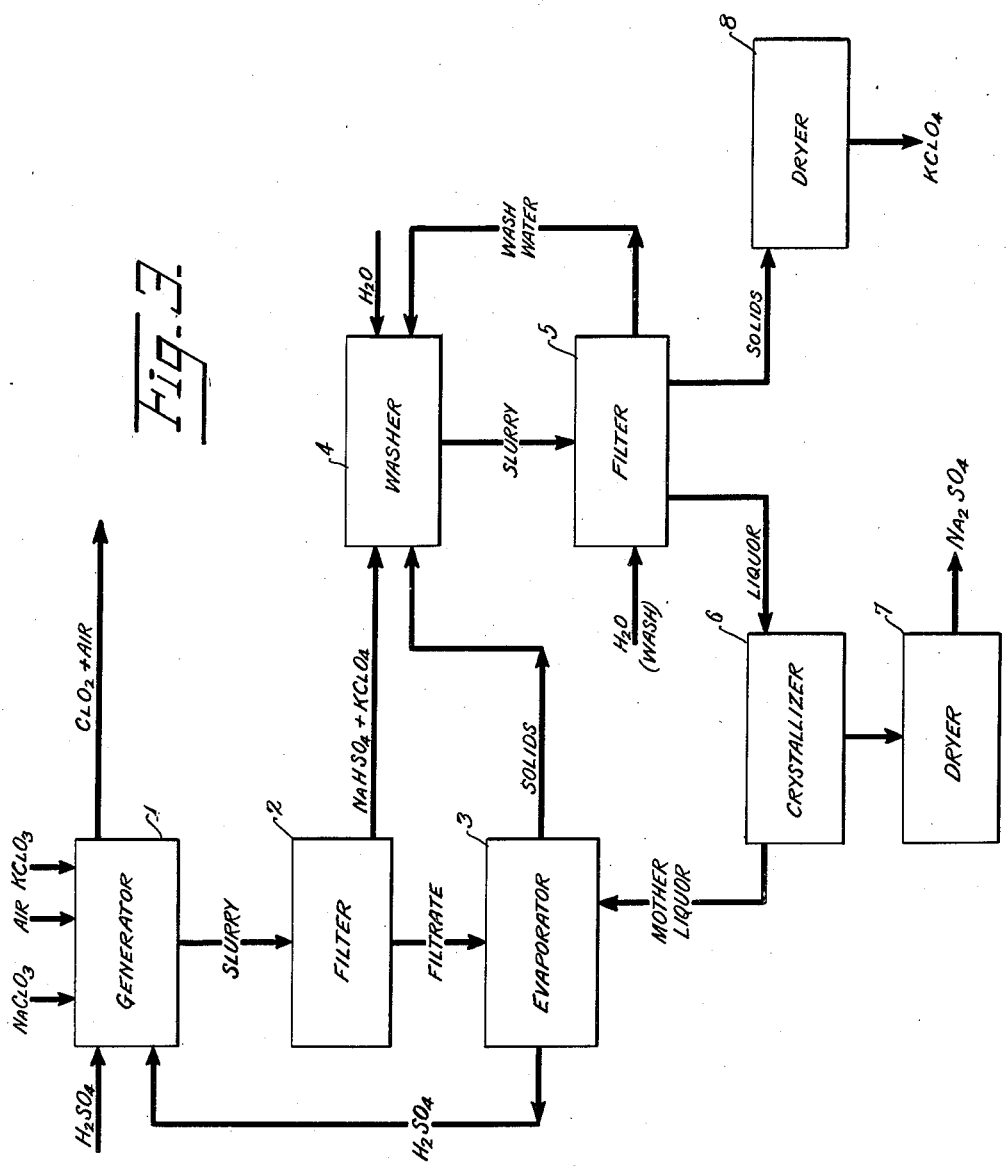

Patented Nov. 29, 1949

2,489,572

UNITED STATES PATENT OFFICE 2,489,572

PROCESS FOR THE PRODUCTION OF PERCHLORATES AND CHLORINE DIOXIDE

Clifford A. Hampel, Harvey, Ill., assignor to Cardox Corporation, Chicago, Ill., a corporation of Illinois Application February 13, 1946, Serial No. 647,403

19 Claims. (Cl. 23—85)

This invention relates to a new process for the production of a perchlorate and chlorine dioxide.

It has been known heretofore that a perchlorate and chlorine dioxide can be produced by the decomposition of a metal chlorate by the use of a strong mineral acid. For example, if potassium chlorate be treated with concentrated sulfuric acid, potassium perchlorate, chlorine dioxide, and potassium sulfate are produced. The equation which illustrates this self-oxidation-reduction reaction is:

(A) 
$3KClO_3 + H_2SO_4 \rightarrow 2ClO_2 + KClO_4 + K_2SO_4 + H_2O$

This prior known process possessed several inherent disadvantages. As will be noted by inspection of Equation A, the metal of the perchlorate formed is also the metal of the salt of the acid simultaneously formed. If the perchlorate of a definite metal is desired, three quivalents of the chlorate of that metal must be decomposed to yield one equivalent of the perchlorate of that metal. Two-thirds of the metal of the chlorate used appears as the generally less valuable salt of the acid used for the reaction. Therefore, the known process is inefficient in that only one-third of the metal whose perchlorate is desired actually is converted to the perchlorate while twice as much ends up as the salt of the acid required for the process.

It will be appreciated that if the metal employed as the chlorate is an expensive one, only one-third of it will be recovered in the form of the more valuable perchlorate, the other two-thirds appearing in the form of the generally less valuable salt of the acid.

Another inherent disadvantage of the prior known process is that it is extremely difficult to effect by practical commercial means the separation of the perchlorate and the salt of the acid when both are compounds of the same metal. Consequently, after practising the know process, the manufacture has been confronted with the additional problem of separating out the desired perchlorate.

It is the primary object of this invention to provide a single process for the production of a perchlorate, chlorine dioxide and a salt of an acid in which the perchlorate and the salt of the acid can be selected in accordance with the particular commercial needs of a given manufacturer.

It is a further important object of this invention to provide a single process by means of which a desired perchlorate can be made from less expensive materials in that only one-third as much of a compound of the metal, whose corresponding perchlorate is desired, need be used as is required by the prior known process.

A further primary object of this invention is to provide a single process by means of which a perchlorate and a salt of an acid, both of which are compounds of different metals, are produced simultaneously, and are readily separable by known commercial facilities.

A specific object of the invention is to provide a single process for producing a perchlorate and the salt of an acid and a different metal in which substantially all of a particular cation introduced into the system, and which is capable of forming the perchlorate, is utilized in the production of the perchlorate while the salt of an acid and a different metal is formed.

Another specific object of the invention is to provide a single process for the production of a perchlorate and a salt of an acid and a different metal by which certain raw materials can be employed for producing the desired perchlorate than the chlorate which is normally employed to produce that product. The use of the less expensive materials is made possible by employing a salt of the metal of desired perchlorate, which salt is less expensive than the corresponding chlorate, to furnish the metal whose perchlorate is desired, while the chlorate ion required for the formation of the perchlorate ion and the chlorine dioxide is furnished as the chlorate of a different metal.

Other objects and advantages of the invention will become apparent during the course of the following description.

The present commercial processes for the manufacture of perchlorates alone all involve the electrolytic oxidation of chlorate ion to perchlorate ion by the use of a platinum anode. The platinum anode is attacked considerably in this electrolytic process, and furthermore is a very expensive anode material. A high capital investment is required for the production of perchlorates by this method.

The present commercial processes for the production of chlorine dioxide are based upon two general reactions. By one a chlorate is reduced by some means to form chlorine dioxide. An inefficiency is inherent in this method in that valuable oxidizing value is lost in oxidizing the reducing agent to a generally useless product. For example, sulfur dioxide can be used to reduce a chlorate to chlorine dioxide, but a considerable amount of the oxidizing value of the chlorate is lost thereby in forming a sulfate whose value is small. A second method of generating chlorine dioxide utilizes the oxidation of a chlorite. This is a very expensive process, since the only known commercial methods of producing the chlorite itself are dependent upon the conversion of chlorine dioxide, by reduction, to a chlorite.

The present invention, therefore, offers a route by which two valuable commercial products can be made simultaneously without loss of any of the valuable oxidizing value of the chlorate used. One-third of the chlorate ion is used to form a perchlorate of a desired metal, and two-thirds of the chlorate ion is converted to chlorine dioxide, while at the same time a salt of the acid involved is recovered as the desired salt of a definite metal different from the metal of the perchlorate.

In accordance with the invention, one equivalent of the metal in the form of a perchlorate is recovered for every equivalent of that same metal which is introduced in a combined form into the reaction. Therefore, all of the metal ion introduced for the purpose of forming a perchlorate actually appears as a perchlorate and is not combined as the salt of the acid which is used. This result in accordance with the invention is accomplished by employing either two chlorates or one chlorate and a salt or salts to introduce the respective different metal ions.

The reaction with two chlorates is represented by the following equation:

(B) $2H(Ac) + 2M^1ClO_3 + M^2ClO_3 \rightarrow$
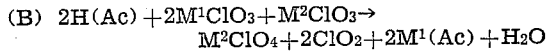
$M^2ClO_4 + 2ClO_2 + 2M^1(Ac) + H_2O$ in which $M^1$ represents a metal selected from the class consisting of lithium, potassium, sodium, strontium, calcium, barium and magnesium, $M^2$ represents another metal from this same group, and (Ac) represents a mineral acid radical other than that of hydrochloric acid.

It will be noted that in Equation B, for every ion of the metal $M^2$ which is consumed as a chlorate, an ion of this same metal appears as a perchlorate in the final products. Therefore, none of this metal is lost by appearing in the final product as a salt of the acid. As a consequence, the metal $M^2$ may be a relatively expensive metal since all of it will be recovered as the more valuable perchlorate.

The reaction with a single chlorate and a salt may be represented by the following equation:

(C) $2H(Ac^1) + 3M^1ClO_3 + M^2(Ac^2) \rightarrow$
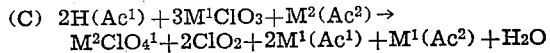
$M^2ClO_4 + 2ClO_2 + 2M^1(Ac^1) + M^1(Ac^2) + H_2O$ in which $M^1$ is a metal selected from the class consisting of lithium, potassium, sodium, strontium, calcium, barium and magnesium, $M^2$ is another metal selected from the same class, (Ac$^1$) is the radical of a strong mineral acid other than hydrochloric acid, and (Ac$^2$) is the radical of the same or a different mineral acid.

It will be observed from Equation C that all of the metallic ion of the metal $M^2$ which is introduced as a salt, appears as the metal of the perchlorate which is recovered. Therefore, as with the reaction of Equation B, this metal $M^2$ may be a relatively expensive one as all of it will be recovered in the more expensive perchlorate.

The order of addition of the reactants in Equations B and C is not of material importance. Thus, considering first the process represented by Equation B, the chlorates may be added simultaneously to the acid, either by mixing them before reacting them with the acid, or by independently, but simultaneously, reacting them with the acid. Or, the chlorates in Equation B may be successively added to the acid, all or part of one chlorate being added first and then the other chlorate being added. It is not necessary to react the two chlorates simultaneously with the acid. The potassium chlorate, for example, may first be reacted, preferably as a solid, and then the sodium or other metal chlorate either as a solid or as a solution.

Referring to Equation C, the chlorate and the salt may be reacted with the acid simultaneously by first premixing the chlorate and the salt, or by delivering them conjointly to the acid either separately or as a mixture.

The chlorates, or the chlorate and the salt, may be reacted with the acid either as solutions or in their solid forms. It is preferable that if they be reacted as solutions, they be in as strong a concentration as is possible so that the dilution of the acid be minimized as much as possible.

The chlorine dioxide gas produced by this invention may be stored or used for any purpose where it is required. It is removed from the acidification operation by continuous passage of a gas which is inert with respect to chlorine dioxide through the reaction vessel. This gas may be, for example, air or nitrogen.

The inert gas not only serves as a means for removing the chlorine dioxide from the reactor as it is formed, but also serves to dilute the concentration of the chlorine dioxide. This is important because if the chlorine dioxide reaches a moderately high concentration, an explosion may occur. It has been found advisable to supply a sufficient amount of the diluent gas so that the chlorine dioxide will not reach a concentration much higher than about 5% by volume.

The temperature at which the process is conducted should be kept below about 70° C. Above this temperature, chlorine dioxide may begin to decompose thermally, although the decomposition temperature will vary with the concentration of the chlorine dioxide in the carrier gas, the lower the concentration, the higher the safe temperature limit. The reaction rate increases with increasing temperature, but above about 70° C. the reaction produces undesirable quantities of chlorine, the efficiency of chlorine dioxide generation being decreased thereby, the useful temperature range is from 0° C. to about 70° C., the rate being about four times as great at 60° C. as it is at 25° C.

The two different metal ions introduced into the acidification operation end up combined as the perchlorate and as the salt of the acid used. If these two different metal ions are introduced as two chlorates, as exemplified by Equation B, they should be present substantially in the ratio one to two on an equivalent basis, the metal ion which is to appear as the perchlorate being the metal ion which is introduced in the lesser amount as a chlorate. This relationship is important because as has been pointed out all of this metal ion appears in the perchlorate and none of it is lost by combination with the acid radical.

Because one of the three equivalents of chlorate reacted goes to perchlorate and the other two equivalents reacted form chlorine dioxide, the equivalent ratio of the two metal ions used must be substantially one to two. The metal ion of the chlorate forming the chlorine dioxide ends up as a salt of the acid used, such metal salt being formed in quantities substantially equivalent to twice the amount of perchlorate formed.

If the two metal ions are introduced one as a chlorate and the other as a salt, as exemplified by Equation C, it will be usual that the metal ion of the salt will be one which it is desired to appear as the metal of the perchlorate. Therefore, since only one-third of the chlorate introduced is converted to the perchlorate, an amount of salt will be used which will furnish metal ion equivalent to one-third of the total chlorate reacted, as this is all that will be necessary to furnish the metal ion of the perchlorate salt desired.

The acid used for the chlorate decomposition may all be fresh acid or it may be in part reconcentrated acid derived by separating and concentrating the excess acid left after the chlorate decomposition has been completed. It is important that the acid be of high concentration and that there be an excess of acid over that required to stoichiometrically react with the chlorate. With a low acid concentration, the chlorate decomposition rate becomes so low as to be impractical. For example, if sulfuric acid is used, the reaction will nearly cease if the concentration is below 60%. For perchloric acid, the minimum concentration appears to be about 49%. As a consequence, there should be a sufficient initial excess of acid so that after all the added chlorate is consumed, the concentration of the acid will still be relatively high. As the reaction proceeds, considerable salt is precipitated and it may, therefore, be deemed advisable to effect a separation of these precipitated salts from the reaction mixture before the minimum concentration of acid is reached.

The action of the acid upon the chlorate to form chlorine dioxide and a perchlorate is not instantaneous. A considerable period of time must be allowed for the complete decomposition of the chlorate. For this reason, the preferred method of operation for the invention is to react the chlorate over a period of time so that the chlorine dioxide formation is continuous. The rate of chlorine dioxide formation is roughly proportional to the rate of addition of the chlorate to the acid, for example, if this be the mode of operation. For this reason, the process may be conducted, as a batch process, or as a continuous process. In the latter case, the chlorate could be reacted continuously and in the desired ratio to the required amount of acid in an appropriate continuously operating apparatus.

Representative acids which may be used are sulfuric acid, perchloric acid, nitric acid, phosphoric acid, or fluosilicic acid, and the minimum concentration to obtain effective results with the particular chlorate or chlorates to be decomposed may be readily determined. The lowest effective concentration varies with the temperature and consequently with higher temperatures, it is possible to use lower concentrations of acid.

If an acid, such as hydrochloric acid, is used, or if appreciable quantities of a chloride salt, such as sodium chloride, are present in the chlorate used or are introduced to the system in any manner, the gaseous product will contain chlorine, as well as chlorine dioxide, the chlorine being formed according to the following equations, wherein the chlorate is represented as chloric acid:

(D)     $2HClO_3 + 10HCl \rightarrow 6Cl_2 + 6H_2O$
(E)     $2HClO_3 + 2HCl \rightarrow Cl_2 + 2ClO_2 + 2H_2O$ It is for this reason that this invention is concerned with the use of acids which do not form chlorine as does hydrochloric acid; the use of hydrobromic and hydroiodic acids is likewise undesirable.

Certain limitations must be observed in choosing the two metal ions which are involved, and also in choosing the acid used if a definite perchlorate is desired. For example, to form a perchlorate of any of the alkaline earth metals, the acid used in the chlorate decomposition operation should not be sulfuric acid, phosphoric acid of fluorsilicic acid, inasmuch as the alkaline earth metal salts of these acids are very insoluble and would immediately precipitate from the system. Nitric acid or perchloric acid may be used with any mixture of metal ions.

If the perchlorate of lithium, sodium, or magnesium is desired, any of the above acids may be used. In the latter case, however, if one of the metals used is potassium, it will separate out and be recovered as potassium perchlorate and this will be true for all instances in which potassium is one of the metal ions in the finished reaction mixture. That is, if potassium ion be present at the time the reaction products are separated, it will be obtained in the form of potassium perchlorate. The selection of the best combination of acid and the metal ions to obtain a desired perchlorate can be made on the basis of a few simple preliminary tests utilizing the limitations just discussed.

In the operation of the invention according to the process exemplified by Equation C, wherein one of the metal ions is introduced as a salt of that metal, the anion of the metal salt may be the same as the acid radical of the acid used or it may be different from the acid radical. If it is the same as the acid radical, for example, a sulfate salt added to sulfuric acid, it is obvious that the salt of the acid formed by the reaction will be the same as the salt derived from the salt added to the reaction along with the chlorate. If said anion be different from the acid radical used, for example, a nitrate salt in conjunction with sulfuric acid, two salts other than the perchlorate will be found in the finished mixture. Practical operating conditions and requirements, as well as economic considerations will largely dictate the choice of the salt used to introduce one of the metal ions for this process.

The cations or metal ions useful for the operation of the invention include the alkali metals, the alkaline earth metals and magnesium. Perchlorates of any of these metals may be made by the operation of this invention. These metal ions may be introduced either as chlorates or as salts as heretofore described. The salt of the acid used, which is formed during the acidification process, will likewise be a salt of one of the above metals.

It should be pointed out that perchloric acid, when used in the operation of the invention, to some degree varies the operational details. This arises from the fact that the perchlorate ion in the acid is a common ion with the perchlorate formed as a product of the reaction. In other words, instead of obtaining one metal perchlorate, two metal perchlorates are formed. One of the metal perchlorates appears as one equivalent, as the reactions exemplified by Equations B and C, while the other perchlorate appears as the two equivalents of the salt of the acid.

Since perchloric acid is a relatively expensive acid, in most cases economy of operation will be achieved if the two equivalents of the one metal perchlorate are converted into perchloric acid for reuse in the acidification process by the use of some cheaper acid, such as sulfuric or hydrochloric acid. By thus regenerating perchloric acid from two of the three equivalents of perchlorate salt formed by the process, the operation of the invention becomes truly cyclic. Two equivalents of perchloric acid are required for the chlorate decomposition and two equivalents of perchlorate salt are reconverted to perchloric acid. This arises from the fact that of the three equivalents of perchlorate ion found in the final completed reaction mixture, only one is created by the chlorate decomposition, the other two being derived from the perchloric acid itself.

The following equations exemplify the above discussion:

(F) $KClO_3 + 2MClO_3 + 2HClO_4 \rightarrow$
$2ClO_2 + KClO_4 + 2MClO_4 + H_2O$ (G) $2MClO_4 + 2HCl \rightarrow 2HClO_4 + 2MCl$ where M represents the second metal ion introduced to the chlorate decomposition operation.

It would be possible, of course, to sell or use elsewhere both of the metal perchlorates formed by the use of perchloric acid, but it will be found in general best to operate the above described cyclic process.

Other acids, for example, nitric acid, can be regenerated for reuse in the process by treating the two equivalents of nitrate salt, which would be formed if nitric acid were used for the decomposition operation, with sulfuric acid, for example. Thus in both cases where perchloric and nitric acids are used, a cyclic operation can be maintained since, except for minor make-up losses, once this system is started, no fresh additional nitric or perchloric acid need be added to the system. It will be appreciated that the consumed acid is in reality the acid used for the regeneration of the above two acids.

It should be pointed out that it is possible to use a mixture of strong acids for the operation of the invention quite satisfactorily. In some cases, the use of mixed acids will make economies of operation possible. This is especially true if perchloric acid be one of the mixed acids, the perchlorate of the one metal added to the system being recovered substantially all in the form of the desired perchlorate while the other metal added to the system appears as the salt of the other one of the mixed acids. For example, if a mixture of sulfuric and nitric acids, commonly known as the "nitrating acids," is used, a metal sulfate and a metal nitrate may be recoverable from the other metal perchlorate. The nitrate and the sulfate can be processed, separated and sold individually, or it may be desirable to regenerate nitric acid from the nitrate salt by proper treatment with sulfuric acid, making it possible to recycle the nitrate acid while only fresh sulfuric acid need be added to the operation for replacement purposes.

As has been mentioned above, an excess of acid is used for the decomposition of the chlorate or chlorates. Important economies are achieved if this excess acid can be reconcentrated and returned to the process after the salt products have been removed from it. In most cases, the salt products, including both the perchlorate and the salt of the acid, are precipitated from the acid medium long before the chlorate decomposition has been completed. This is due to the low solubility of salts in general in concentrated acids. Therefore, the excess acid can usually be separated from the salt products of the reaction by atmospheric or centrifugal filtration, the thus separated acid being reconcentrated and returned to the decomposition operation along with the necessary fresh acid to replace the acid consumed by the operation.

The perchlorate desired and the salt of the other metal are separated by utilization of the mutually different solubilities of the definite compounds in aqueous solutions. The separation of the various products, including the acid carried physically by the solid products will entail the use of such common chemical engineering unit operations as evaporation, crystallization, washing and filtration.

In those cases in which potassium is one of the metals introduced into the system, it will appear principally as potassium perchlorate. As it is quite insoluble, it may easily be separated from the salt of the acid. However, if the salt of the acid be such a compound as calcium sulfate, for example, the potassium perchlorate, being much more soluble than calcium sulfate, can be separated by the addition of sufficient water to dissolve all of the potassium perchlorate. As another example of the separation of products, if the metals introduced into the chlorate decomposition operation are sodium and barium, the barium sulfate which is formed is more insoluble than the sodium perchlorate which is formed, and addition of water to the salt mixture will dissolve all of the sodium perchlorate to remove it from the barium sulfate.

It will be understood that the barium and sodium ions may both be introduced as chlorates, or one may be introduced as a chlorate and the other as a salt. Because in most cases the two metal ions will be so selected that they have different solubilities in the form of their respective products, no great difficulty will be experienced in separating the products from each other. The question of whether the perchlorate or the salt of the acid is the more insoluble is readily determined.

It is recognized that a commercially valuable perchlorate product would be produced, if the perchlorate were left associated with part of or all of the salt of the acid simultaneously formed. If such a product is desired, the only separation which need be made is that or removing the final salt products, including the perchlorate, from the excess acid. To exemplify the above noted innovation to the processes represented by Equations B and C, it is possible to prepare a mixture of sodium perchlorate and calcium sulfate, for example, by decomposing a mixture of one mole of sodium chlorate and one mole of calcium chlorate by the use of sulfuric acid. After the excess sulfuric acid has been removed, a mixed product containing substantially equal moles of calcium sulfate and sodium perchlorate can be recovered by drying the separated mixture.

It will be appreciated that a mixture of perchlorates, for example, rather than a single perchlorate, could be produced by this invention by the introduction of a mixture of metal ions to be equivalent to one-third of the chlorate decomposed on an equivalent basis. For example, a mixture of sodium and potassium perchlorates can be obtained by the reaction exemplified by the equation following:

(H) $Ca(ClO_3)_2 + \frac{1}{2}KClO_3 + \frac{1}{2}NaClO_3 + H_2SO_4 \rightarrow$
$2ClO_2 + CaSO_4 + \frac{1}{2}NaClO_4 + \frac{1}{2}KClO_4 + H_2O$ The three salt products after being separated from the excess sulfuric acid are treated with sufficient water to dissolve the two perchlorates, leaving solid calcium sulfate. The solution of the two perchlorates can then be evaporated to yield a mixture of equivalent amounts of sodium and potassium perchlorates.

It will be appreciated that the invention as fully exemplified above can be practiced so that the various components required need not be introduced into the system in any particular sequence, so long as they all enter the system to effect the reaction desired.

This invention is further explained by the following example illustrated by the flow diagram shown in Figure 1.

*Example I*

A mixture of three moles of sodium chlorate and one-half mole of potassium sulfate are treated in the generator 1 with sufficient 85% sulfuric acid at temperature above room temperature, but below about 65° C. to totally decompose the chlorate. This operation forms two moles of chlorine dioxide, one mole of potassium perchlorate and one and one-half moles of sodium sulfate. The chlorine dioxide formed in the generator 1 is removed from the generator by the continuous passage of sufficient air to keep the chlorine dioxide concentration in the exit gases at about 30 mm. Hg partial pressure.

The slurry from the generator 1, after all of the chlorate has been decomposed and the chlorine dioxide stripped off, is passed to filter 2 where the solid potassium perchlorate and sodium sulfate are separated. These solids are treated in washer 3 with sufficient water to dissolve all of the sodium sulfate. Slurry from the washer 3, consisting of solid potassium perchlorate in a solution of sodium sulfate and sulfuric acid, is filtered in filter 4 to separate the potassium perchlorate, which is dried in dryer 5 to a solid potassium perchlorate product. Sufficient wash water is used in filter 4 to remove substantially all of the sodium sulfate and sulfuric acid adhering to the potassium perchlorate crystals, and this wash water is used in washer 3 to supply all or part of the water required there to dissolve the sodium sulfate.

Filtrate from filter 4 is cooled in crystallizer 6 to precipitate sodium sulfate decahydrate. This hydrated sodium sulfate is dried in dryer 7 to form anhydrous sodium sulfate. Mother liquor from the crystallizer 6 is concentrated in evaporator 8 along with the filtrate from filter 2 to give a sulfuric acid solution of a concentration sufficient for reuse in generator 1. Solids formed in this evaporation are fed to the washer 3 for reworking. The concentrated sulfuric acid from the evaporator 8 is reused in the generator 1 along with fresh acid for subsequent chlorate decomposition operations. The quantity of fresh acid needed in the generator 1 is equivalent to two-thirds of the sodium sulfate removed from the process in dryer 7.

*Example II*

Figure 2:
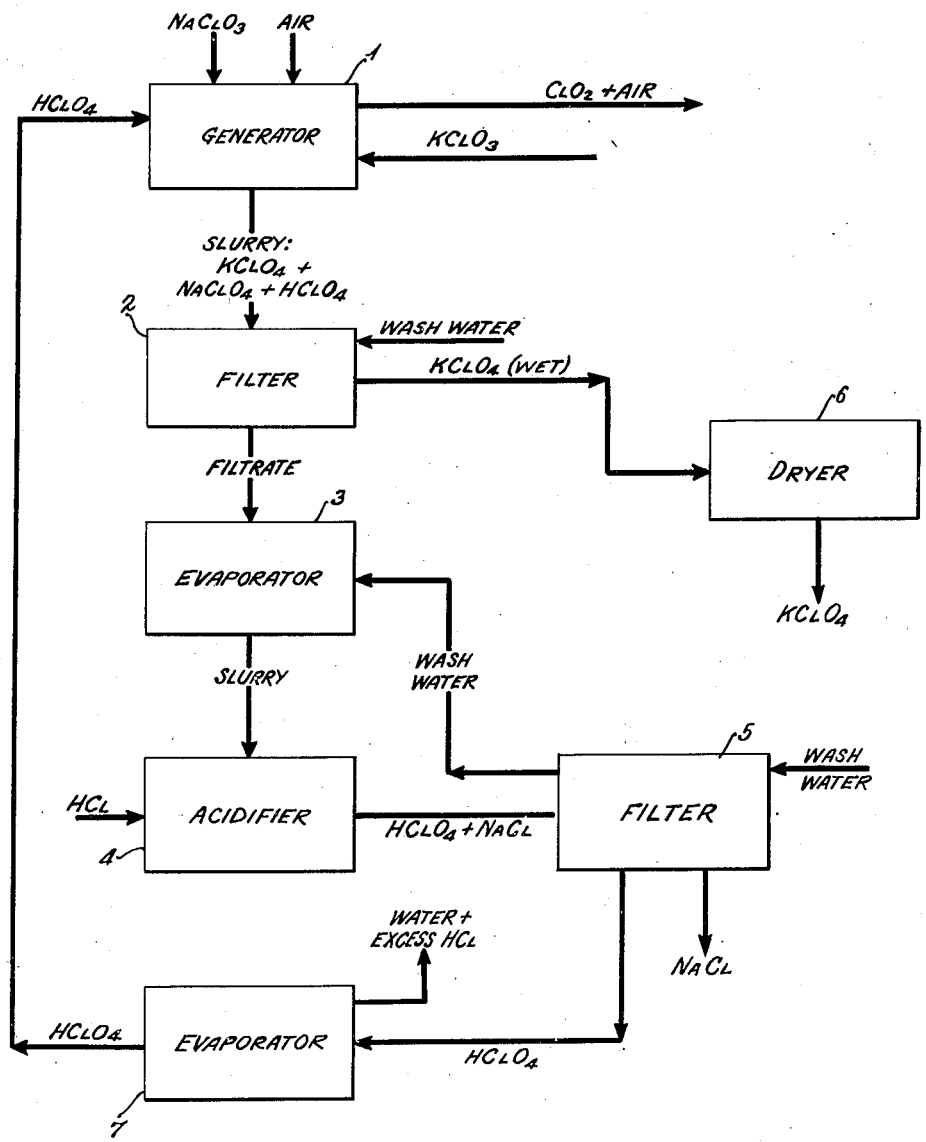

This example illustrated by the accompanying flow diagram as shown in Figure 2 involves the use of perchloric acid and potassium and sodium chlorates in the decomposition step. In the generator 1 concentrated perchloric acid from the final step of preparation of it in filter 5 is reacted with a mixture of two moles of fresh sodium chlorate and one mole of potassium chlorate. The two moles of chlorine dioxide gas formed by this reaction are removed from the generator 1 for use elsewhere by the passage of a stream of air through the generator. The slurry of one mole of potassium perchlorate, two moles of sodium perchlorate and the excess diluted perchloric acid from the generator 1 is filtered in filter 2 to remove substantially all of the potassium perchlorate. This wet cake of potassium perchlorate is washed free of perchloric acid and sodium perchlorate and dried in dryer 6 to form a solid potassium perchlorate product.

Filtrate from filter 2 combined with wash water used in the potassium perchlorate filtration is fed to evaporator 3 for concentration. Sodium perchlorate is precipitated during this concentration of the acid to about 65% perchloric acid. Slurry from evaporator 3 is treated in acidifier 4 with hydrogen chloride or concentrated hydrochloric acid in slight excess of the total perchlorate salt content of the feed. Sodium chloride is formed and precipitated by this method of perchloric acid regeneration. The contents of the acidifier 4 are filtered in filter 5 to separate the precipitated sodium chloride. Wash water used in washing the sodium chloride filter cake is added to evaporator 3 for concentration. The perchloric acid filtrate from filter 5 is further concentrated in evaporator 7, preferably by a partial vacuum evaporation, and during this process any excess hydrogen chloride is driven off along with the water. Also, the small amount of sodium chloride in the perchloric acid as it leaves filter 5 is converted to hydrogen chloride and driven off by the heating of the evaporator. Therefore, very little chloride ion is left in the concentrated perchloric acid returned to the generator 1. The solubility of sodium chloride in concentrated perchloric acid is of the order of 0.01% or less by weight. While a separate evaporator 7 is shown in the accompanying diagram for this final concentration step, evaporator 3 could be used alternately for the two evaporation steps.

The overall reactions occurring in the above cycle can be expressed by the following equations; the operations are not restricted thereby, the object of presenting these equations being for illustrative purposes only:

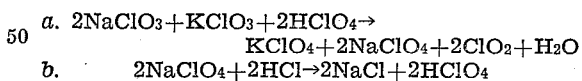

$a.\ 2NaClO_3 + KClO_3 + 2HClO_4 \rightarrow$
$\qquad KClO_4 + 2NaClO_4 + 2ClO_2 + H_2O$
$b.\ \qquad 2NaClO_4 + 2HCl \rightarrow 2NaCl + 2HClO_4$ Reactants consist of two moles each of sodium chlorate and hydrogen chloride and one mole of potassium chlorate, and products are one mole of potassium perchlorate and two moles each of chlorine dioxide and sodium chloride.

In the above example, one of several different methods of carrying out the regeneration of the perchloric acid and the return of it and the excess perchloric acid to the system has been described. Several other variations are possible. For example, the unreacted perchloric acid is first separated from the precipitated potassium perchlorate and sodium perchlorate, and then water can be added to the precipitated salts to dissolve all of the sodium perchlorate.

This solution of sodium perchlorate can be concentrated, treated with regenerating acid, for example, hydrochloric acid, and separated from the thus formed sodium chloride. This regenerated perchloric acid can be mixed with the previously separated unreacted perchloric acid for further concentration and return to the acidification operation. Such a method of operating differs from the one shown in the above example in that the unreacted perchloric acid is not present at the time that the sodium perchlorate is regenerated.

Other methods of conducting the regeneration and reconcentration step may be used depending upon the demands of the individual manufacturer. It will be appreciated that while sodium perchlorate has been mentioned above as the second metal perchlorate similar treatments can be applied to other perchlorates to effect the conversion of said perchlorate to perchloric acid.

Figure 3 of the drawings illustrates the invention as a schematic flow diagram, when sulfuric acid and potassium and sodium chlorates are used.

*Example III*

In the generator 1 fresh concentrated sulfuric acid is mixed with reconcentrated sulfuric acid from the evaporator 3. Acid from the evaporator 3 is saturated with potassium perchlorate and sodium sulfate. To this acid is added potassium chlorate and sodium chlorate, the mole ratio of sodium to potassium being two to one. Air passed through the generator 1 carries away the chlorine dioxide formed. The liquor from the generator 1, containing precipitated potassium perchlorate and sodium sulfate, is passed to filter 2. The filtrate, consisting of sulfuric acid of over 60% concentration and saturated with respect to both potassium perchlorate and sodium sulfate, is concentrated in evaporator 3.

Liquor from this evaporator 3, consisting now of about 85% sulfuric acid saturated with potassium perchlorate and sodium sulfate, is returned to the generator 1 for reuse. Solids from this evaporator 3 are combined with solids from filter 2 and treated with water in a washer 4. After filtration in filter 5 a solid potassium perchlorate product is removed for drying in dryer 8. Filtrate from the filter 5 is cooled in a crystallizer 6 to precipitate sodium sulfate which is dried in dryer 7. Mother liquor from the crystallizer 6 is added to the feed to evaporator 3 for concentration. Wash water from the filter 5 can also be added to evaporator 3 for similar treatment, but it can more advantageously be used in washer 4 along with fresh water.

The overall reactions occurring in the above process can be expressed by the following equations, but the operations are not restricted thereby, the object of presenting these equations being for illustrative purposes only.

h. 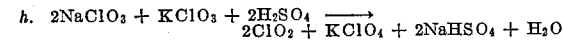

i. 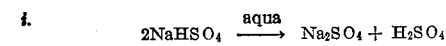

The reactants consist of two moles of sodium chlorate and one mole each of potassium chlorate and sulfuric acid, and the products are one mole each of potassium perchlorate and sodium sulfate, and two moles of chlorine dioxide.

As one possible variation, sufficient water can be added to the slurry from generator 1 to bring all the sodium acid sulfate into solution. In this case, potassium perchlorate is delivered to washer 4, and is then dried in dryer 8. The unreacted sulfuric acid and the sodium sulfate pass to evaporator 3 for concentration and then to crystallizer 6 for precipitation of the sodium sulfate. The acid from crystallizer 6 is returned to generator 1.

If the process of this invention were carried out using potassium chlorate and calcium chlorate as the two chlorates, there would be formed potassium perchlorate and calcium sulfate. In this case, since the calcium sulfate is more insoluble than is the potassium perchlorate, sufficient water would be added in the separation step to bring all the potassium perchlorate into solution, the calcium sulfate then being filtered off for separate recovery. By concentrating the potassium perchlorate solution, the potassium perchlorate can be recovered.

Related subject matter is disclosed in my co-pending cases as follows: Ser. No. 659,042, filed April 2, 1946, directed to perchlorate production; Ser. Nos. 647,404 filed February 13, 1946, and 659,043, filed April 2, 1946, directed to the production of chlorates and chlorites; Ser. No. 647,396, filed February 13, 1946, directed to the production of perchlorates and involving the production of chlorates; and Ser. Nos. 736,113, filed March 20, 1947, 756,542, 756,543, and 756,544, filed June 23, 1947, directed to the separation of salts in salt systems containing a chlorate and a chlorite.

The separation of salts in a slurry obtainable by the reaction of sulfuric acid on a mixture of potassium and sodium chlorates, comprehended by the disclosure of this application, is claimed in my co-pending application, Ser. No. 729,462, filed February 19, 1947.

What I claim is:

1. A process for producing a perchlorate and chlorine dioxide, which comprises reacting in a substantially halide-free medium a strong mineral acid, a metal chlorate, and a compound selected from the group consisting of a chlorate of a different metal and a different soluble salt of a different metal, said metals being selected from the group consisting of potassium, sodium, lithium, calcium, barium, strontium, and magnesium, whereby is produced a perchlorate of one of the selected metals, a salt product formed from another of the selected metals and from the anion of the acid employed, and chlorine dioxide, the metal of the perchlorate desired being introduced in about one-third the amount of the total chlorate consumed on an equivalent weight basis, said acid being so selected that the anion thereof does not form an insoluble salt with the metal whose perchlorate is desired, and said chlorate and said different chlorate and salt being so selected that substantially no potassium ion is present when a perchlorate other than potassium is desired.

2. A process for producing a perchlorate and chlorine dioxide, which comprises reacting in a substantially halide-free medium a strong mineral acid, a metal chlorate, and a compound selected from the group consisting of a chlorate of a different metal and a different soluble salt of a different metal, said metals being selected from the group consisting of potassium, sodium, lithium, calcium, barium, strontium and magnesium, whereby is produced a perchlorate of one of the selected metals, a salt product formed from another of the selected metals and from the anion of the acid employed, and chlorine dioxide, the metal of the perchlorate desired being introduced in about one-third the amount of the total chlorate consumed on an equivalent weight basis, said acid being so selected that the anion thereof does not form an insoluble salt with the metal whose perchlorate is desired, and said chlorate and said different chlorate and salt being so selected that substantially no potassium ion is present when a perchlorate other than potassium is desired, and the chlorate addition being in an amount materially less than is necessary to consume all the acid so that a high concentration of acid remains.

3. A process for producing a perchlorate and chlorine dioxide, which comprises reacting in a substantially halide-free medium a strong mineral acid and two different metal chlorates, the metal of each of said chlorates being selected from the group consisting of potassium, sodium, lithium, calcium, barium, strontium and magnesium, so that there is produced a perchlorate of one of the selected metals, a salt product formed from the other of the selected metals and the anion of the acid, and chlorine dioxide, the metal of the perchlorate desired being introduced in about half the amount of said other selected metal on an equivalent weight basis, said acid being so selected that the anion thereof does not form an insoluble salt with the metal whose perchlorate is desired, and said chlorates being so selected that substantially no potassium ion is present when a perchlorate other than potassium is desired.

4. A process for producing a perchlorate and chlorine dioxide, which comprises reacting in a substantially halide-free medium a strong mineral acid and two different metal chlorates, the metal of each of said chlorates being selected from the group consisting of potassium, sodium, lithium, calcium, barium, strontium and magnesium, so that there is produced a perchlorate of one of the selected metals, a salt product formed from the other of the selected metals and the anion of the acid, and chlorine dioxide, the metal of the perchlorate desired being introduced in about half the amount of said other selected metal on an equivalent weight basis, said acid being so selected that the anion thereof does not form an insoluble salt with the metal whose perchlorate is desired, and said chlorates being so selected that substantially no potassium ion is present when a perchlorate other than potassium is desired, and the combined chlorate addition being in an amount materially less than is necessary to consume all the acid so that a high concentration of the acid remains.

5. A process for producing a perchlorate and chlorine dioxide which comprises reacting in a substantially halide-free medium a strong mineral acid, a metal chlorate and a different salt of a different metal, the metals of said chlorate and said salt each being selected from the group consisting of potassium, sodium, lithium, calcium, barium, strontium, and magnesium, whereby is produced a perchlorate of one of the selected metals, a salt product formed from the other of the selected metals and from the anion of the acid employed, and chlorine dioxide, the metal of the perchlorate desired being introduced in about one-third the amount of the total chlorate consumed on an equivalent weight basis, said acid being so selected that the anion thereof does not form an insoluble salt with the metal whose perchlorate is desired, and said chlorate and said salt being so selected that substantially no potassium ion is present when a perchlorate other than potassium is desired.

6. The process for producing a perchlorate and chlorine dioxide which comprises reacting in a substantially halide-free medium a strong mineral acid, a chlorate and a different salt, the metal of said chlorate and the metal of said salt being different ones selected from the class consisting of potassium, sodium, lithium, calcium, barium, strontium and magnesium, whereby is produced a perchlorate of one of the selected metals, a salt product formed from another of the selected metals and from the anion of the acid employed, and chlorine dioxide, the salt which is introduced being present in about one-third the amount of said chlorate present on a stoichiometrically equivalent basis, said acid being so selected that the anion thereof does not form an insoluble salt with the metal whose perchlorate is desired, and said chlorate and said different salt being so selected that substantially no potassium ion is present when a perchlorate other than potassium is desired.

7. A process for producing a perchlorate and chlorine dioxide, which comprises reacting in a substantially halide-free medium a strong mineral acid, a metal chlorate, and a compound selected from the group consisting of a chlorate of a different metal and a different soluble salt of a different metal, said metals being selected from the group consisting of potassium, sodium, lithium, calcium, barium, strontium and magnesium, whereby is produced a perchlorate of one of the selected metals, a salt product formed from another of the selected metals and from the anion of the acid employed, and chlorine dioxide, the metal of the perchlorate desired being introduced in about one-third the amount of the total chlorate consumed on an equivalent weight basis said acid being so selected that the anion thereof does not form an insoluble salt with the metal whose perchlorate is desired, and said chlorate and said different chlorate and salt being so selected that substantially no potassium ion is present when a perchlorate other than potassium is desired, the chlorate addition being in an amount materially less than is necessary to consume all the acid so that a high concentration of the acid remains, separating the unreacted acid from the reaction products, and concentrating and recycling the same to the process.

8. The process which comprises reacting an excess amount of strong perchloric acid, potassium chlorate and a chlorate whose metal is selected from the class consisting of lithium, sodium, strontium, calcium, barium and magnesium so that there is produced potassium perchlorate, a perchlorate salt of the selected metal, and chlorine dioxide, the potassium chlorate being present in an amount stoichiometrically equivalent to approximately half the other chlorate separating the potassium perchlorate and perchlorate salt thus produced and separating the excess perchloric acid from the above products, and concentrating this acid for reuse in the process.

9. The process which comprises reacting an excess amount of strong perchloric acid, potassium chlorate and a chlorate whose metal is selected from the class consisting of lithium, sodium, strontium, calcium, barium and magnesium so that there is produced potassium perchlorate, a perchlorate salt of the selected metal, and chlorine dioxide, the potassium chlorate being present in an amount stoichiometrically equivalent to approximately half the other chlorate and the amount of chlorate addition being less than that which will reduce the perchloric acid to about a 49% concentration.

10. The process which comprises reacting with an excess amount of strong perchloric acid, potassium chlorate and a chlorate whose metal is selected from the class consisting of lithium, sodium, strontium, calcium, barium and magnesium so that there is produced potassium perchlorate, a perchlorate salt of the selected metal, and chlorine dioxide, the potassium chlorate being present in an amount stoichiometrically equivalent to approximately half the other chlorate.

11. The process which comprises reacting an excess amount of strong perchloric acid, potassium chlorate and a chlorate whose metal is selected from the class consisting of lithium, sodium, strontium, calcium, barium and magnesium, so that there is produced potassium perchlorate, a perchlorate salt of the selected metal, and chlorine dioxide, separating the potassium perchlorate from the unreacted perchloric acid converting said perchlorate salt of the selected metal to perchloric acid by reaction with a stronger acid, and concentrating and returning the unreacted perchloric acid and converted perchloric acid to the process.

12. The process which comprises reacting an excess amount of strong perchloric acid, a chlorate of a metal selected from the class consisting of potassium, lithium, sodium, strontium, calcium, barium and magnesium, and after the reaction is substantially completed adding a chlorate of a different metal selected from said class, the metal of one of the chlorates being potassium, whereby is produced potassium perchlorate, a perchlorate salt of said different selected metal, and chlorine dioxide, the potassium chlorate being introduced in approximately half the amount of the other chlorate on an equivalent weight basis.

13. The process which comprises simultaneously reacting an excess amount of strong perchloric acid, potassium chlorate and a chlorate whose metal is selected from the class consisting of lithium, strontium, calcium, barium and magnesium so that there is produced potassium perchlorate, a perchlorate salt of the selected metal, and chlorine dioxide, the potassium chlorate being introduced in approximately half the amount of the other chlorate on an equivalent weight basis 14. The process which comprises reacting an excess amount of strong sulfuric acid, potassium chlorate and another chlorate whose metal is selected from the class consisting of lithium, sodium, strontium, calcium, barium and magnesium so that there is produced potassium perchlorate, a sulfate salt of the selected metal, and chlorine dioxide, separating the remaining free sulfuric acid from the above products, and concentrating this acid for reuse in the process.

15. A process which comprises reacting an excess amount of sulfuric acid, potassium chlorate and another chlorate whose metal is selected from the group consisting of lithium, sodium, calcium, barium, strontium and magnesium so that there is produced potassium perchlorate, a sulfate salt of the selected metal, and chlorine dioxide, the potassium chlorate being introduced in approximately half the amount of the other chlorate on an equivalent weight basis, and the total chlorate addition being less than that which will reduce the sulfuric acid to about 60% concentration.

16. The process which comprises reacting an excess amount of strong sulfuric acid, potassium chlorate and another chlorate whose metal is selected from the class consisting of lithium, sodium, strontium, calcium, barium and magnesium so that there is produced potassium perchlorate, a sulfate salt of the selected metal, and chlorine dioxide.

17. A process which comprises reacting an excess amount of sulfuric acid, potassium chlorate and another chlorate whose metal is selected from the group consisting of lithium, sodium, calcium, barium, strontium and magnesium so that there is produced potassium perchlorate, a sulfate salt of the selected metal, and chlorine dioxide, the potassium chlorate being introduced in approximately half the amount of the other chlorate on an equivalent weight basis.

18. A process which comprises reacting an excess amount of sulfuric acid and a chlorate whose metal is selected from the group consisting of potassium, lithium, sodium, calcium, barium, strontium, and magnesium, and thereafter adding a different chlorate from said group, one of the chlorates being that of potassium, whereby is produced potassium perchlorate, a sulfate salt of the other selected metal, and chlorine dioxide.

19. The process which comprises simultaneously reacting an excess amount of strong sulfuric acid, potassium chlorate and another chlorate whose metal is selected from the class consisting of lithium, sodium, strontium, calcium, barium and magnesium so that there is produced potassium perchlorate, a sulfate salt of the selected metal, and chlorine dioxide.

CLIFFORD A. HAMPEL.

REFERENCES CITED

The following references are of record in the file of this patent:

Scott, "Standard Methods of Chemical Analysis," vol. I, D. Van Nostrand Co., New York, 1925, page 412.

Mellor, "Comprehensive Treatise on Inorg. and Theoretical Chemistry," vol. II, Longmans, Green & Co., New York, 1922, pages 380, 381, and 395.